(12) United States Patent
Ota

(10) Patent No.: US 9,914,218 B2
(45) Date of Patent: Mar. 13, 2018

(54) METHODS AND APPARATUSES FOR RESPONDING TO A DETECTED EVENT BY A ROBOT

(71) Applicant: Toyota Motor Engineering & Manufacturing North America, Inc., Erlanger, KY (US)

(72) Inventor: Yasuhiro Ota, Santa Clara, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 48 days.

(21) Appl. No.: 14/609,854

(22) Filed: Jan. 30, 2015

(65) Prior Publication Data

US 2016/0221191 A1   Aug. 4, 2016

(51) Int. Cl.
*G05B 19/04*   (2006.01)
*G05B 19/18*   (2006.01)
(Continued)

(52) U.S. Cl.
CPC ........... *B25J 9/1664* (2013.01); *B25J 9/1674* (2013.01); *B25J 9/1697* (2013.01); *G05D 1/021* (2013.01);
(Continued)

(58) Field of Classification Search
CPC ... B25J 9/161; B25J 9/163; B25J 9/167; B25J 9/1612; B25J 9/1656; B25J 9/1661; B25J 9/1664; B25J 9/1674; B25J 9/1697; B25J 9/1669; B25J 9/1676; B25J 9/1689; B25J 9/1694; G05D 1/021; G05D 1/0246; Y10S 901/01; Y10S 901/47
(Continued)

(56) References Cited

U.S. PATENT DOCUMENTS 6,542,809 B2   4/2003   Hehls, II
6,554,987 B1   4/2003   Gilchrist et al.
(Continued)

FOREIGN PATENT DOCUMENTS

EP   2363251 A1   9/2011
WO   2012104626 A1   8/2012

OTHER PUBLICATIONS

Edsinger et al. "Human-Robot Interaction for Cooperative manipulation handing objects to one another", Aug. 2007, IEEE.*
(Continued)

*Primary Examiner* — Rachid Bendidi
(74) *Attorney, Agent, or Firm* — Dinsmore & Shohl LLP

(57) ABSTRACT

In one embodiment, a method for responding to a detected event by a robot is provided. The method includes using a sensor to detect an event within an operational space of a robot. The event includes a movement of an object or a person within the operational space. The method also includes using a processor to predict an action to occur within the operational space of the robot based upon the detected event. The method also identifies at least one correlated robot action to be taken in response to the detected event and compares the predicted action to a movement plan of the robot. The method further selects at least one of the correlated robot actions and modifies a movement plan of a robot to include at least one of the identified correlated robot actions in response to the detected event.

15 Claims, 6 Drawing Sheets

(51) Int. Cl.
*B25J 9/16* (2006.01)
*G05D 1/02* (2006.01)

(52) U.S. Cl.
CPC ........... *G05D 1/0246* (2013.01); *Y10S 901/01* (2013.01); *Y10S 901/47* (2013.01)

(58) Field of Classification Search
USPC ............ 700/245, 249–255, 259; 318/568.11, 318/568.12, 568.13, 587; 901/1, 47
See application file for complete search history.

(56) References Cited

U.S. PATENT DOCUMENTS

| | | | |
|---|---|---|---|
| 6,710,706 | B1 | 3/2004 | Withington et al. |
| 7,336,226 | B2 | 2/2008 | Jung et al. |
| 7,751,937 | B2 | 7/2010 | Sabe et al. |
| 7,761,231 | B2 * | 7/2010 | Kawabe .................. B25J 19/021 318/568.12 |
| 7,778,732 | B2 * | 8/2010 | Adachi .................. B25J 9/0003 318/568.12 |
| 7,840,326 | B1 | 11/2010 | Yamada |
| 8,140,188 | B2 | 3/2012 | Takemitsu et al. |
| 8,438,127 | B2 | 5/2013 | Kurata et al. |
| 8,442,714 | B2 | 5/2013 | Matsukawa et al. |
| 8,660,734 | B2 | 2/2014 | Zhu et al. |
| 8,706,298 | B2 | 4/2014 | Goulding |
| 8,825,488 | B2 | 9/2014 | Scrobbins, II et al. |
| 2005/0096839 | A1 | 5/2005 | Nakano et al. |
| 2005/0215171 | A1 * | 9/2005 | Oonaka .................. A63H 3/28 446/301 |
| 2006/0049939 | A1 * | 3/2006 | Haberer .................. F16P 3/14 340/541 |
| 2006/0126918 | A1 * | 6/2006 | Oohashi ............... G05D 1/0251 382/153 |
| 2007/0027579 | A1 * | 2/2007 | Suzuki ................. G05D 1/0251 700/245 |
| 2008/0086236 | A1 * | 4/2008 | Saito ..................... G01S 5/0252 700/245 |
| 2008/0161970 | A1 * | 7/2008 | Adachi .................. B25J 9/0003 700/253 |
| 2009/0043440 | A1 * | 2/2009 | Matsukawa .......... G05D 1/0214 701/25 |
| 2010/0076597 | A1 * | 3/2010 | Wang ....................... A63H 3/28 700/245 |
| 2010/0138366 | A1 * | 6/2010 | Zhang ...................... G06N 5/02 706/12 |
| 2011/0050878 | A1 * | 3/2011 | Wells ..................... H04N 7/181 348/86 |
| 2011/0238212 | A1 | 9/2011 | Shirado et al. |
| 2012/0053826 | A1 | 3/2012 | Slamka |
| 2012/0290132 | A1 * | 11/2012 | Kokubo ................. B25J 9/1666 700/255 |
| 2013/0115579 | A1 | 5/2013 | Taghavi |
| 2013/0170752 | A1 | 7/2013 | Ramnath Krishnan et al. |
| 2013/0261796 | A1 | 10/2013 | Park |
| 2014/0005827 | A1 * | 1/2014 | Ogawa ................... B25J 9/1674 700/250 |
| 2014/0055229 | A1 | 2/2014 | Amedi et al. |
| 2014/0057232 | A1 | 2/2014 | Wetmore et al. |
| 2014/0184384 | A1 | 7/2014 | Zhu et al. |
| 2015/0158178 | A1 * | 6/2015 | Burmeister ............ B25J 9/1676 382/203 |

OTHER PUBLICATIONS

Takayuki Kanda, et al.; Who will be the customer?: A social robot that anticipates people's behavior from their trajectories; UbiComp '08 Proceedings of the 10th International Conference of Ubiquitous Computing; ACM, Sep. 21, 2008; ISBN: 978-1-60558-136-1.

* cited by examiner

METHODS AND APPARATUSES FOR RESPONDING TO A DETECTED EVENT BY A ROBOT

TECHNICAL FIELD

The present specification generally relates to robot movement systems utilizing an intelligent prediction device and methods for use of intelligent prediction in a robot system and, more specifically, robot movement systems and methods for use in robot systems predicting user behavior and controlling movement of a robot in response.

BACKGROUND

Robots may operate within a space to perform particular tasks. For example, servant robots may be tasked with navigating within an operational space, locating objects, and manipulating objects. A robot may be commanded to move from a first location to a second location within the operational space. Robots are often programmed to move between various locations within the operational space or are directly controlled by a user within the operational space. However, people, animals or even other independently moving robot systems moving within the operational space introduce uncertainty for a robot operating within that space.

Accordingly, a need exists for alternative robot systems and methods and computer-program products for predicting one or more events in response to changes in the environment around the robot and controlling movement of a robot in response.

SUMMARY

In one embodiment, a method for responding to a detected event by a robot is provided. The method includes using a sensor to detect an event within an operational space of a robot. The event includes a movement of an object or a person within the operational space. The method also includes using a processor to predict an action to occur within the operational space of the robot based upon the detected event. The method also identifies at least one correlated robot action to be taken in response to the detected event and compares the predicted action to a movement plan of the robot. The method further selects at least one of the correlated robot actions and modifies a movement plan of a robot to include at least one of the identified correlated robot actions in response to the detected event.

In another embodiment, an apparatus includes a robot locomotion device adapted to move a robot within an operational space of a robot. The apparatus also includes a sensor adapted to detect an event within the operational space and a controller adapted to control the locomotion device in accordance with a movement plan. The controller is further adapted to predict an action to occur within the operational space and identify at least one correlated robot action to be taken in response to the detected event. The controller is also adapted to compare the predicted action to the movement plan of the robot and select at least one of the correlated robot actions. The controller is also adapted to modify a movement plan to include at least one of the identified correlated robot actions in response to the detected event.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Implementations of the present disclosure are directed to robots, methods of controlling robot movement and computer program products for controlling robot movement by predicting behavior within an operational space of a robot and generating and/or modifying a movement plan of a robot in response to the predicted behavior. The movement plan in various implementations may include locomotion of the robot within the operational space and/or motion of one or more components such as a manipulator of the robot. More particularly, implementations described herein predict one or more behaviors within an operational space of a robot by observing or detecting one or more changes within the operational space of the robot. Implementations further generate and/or modify the movement plan of the robot in response to the predicted behavior. Implementations may also take into consideration uncertainties when evaluating the movement plan during movement of the robot. Various implementations of methods and computer-program products for behavior detection and generation and/or modification of a robot movement plan are described below.

Figure 1:
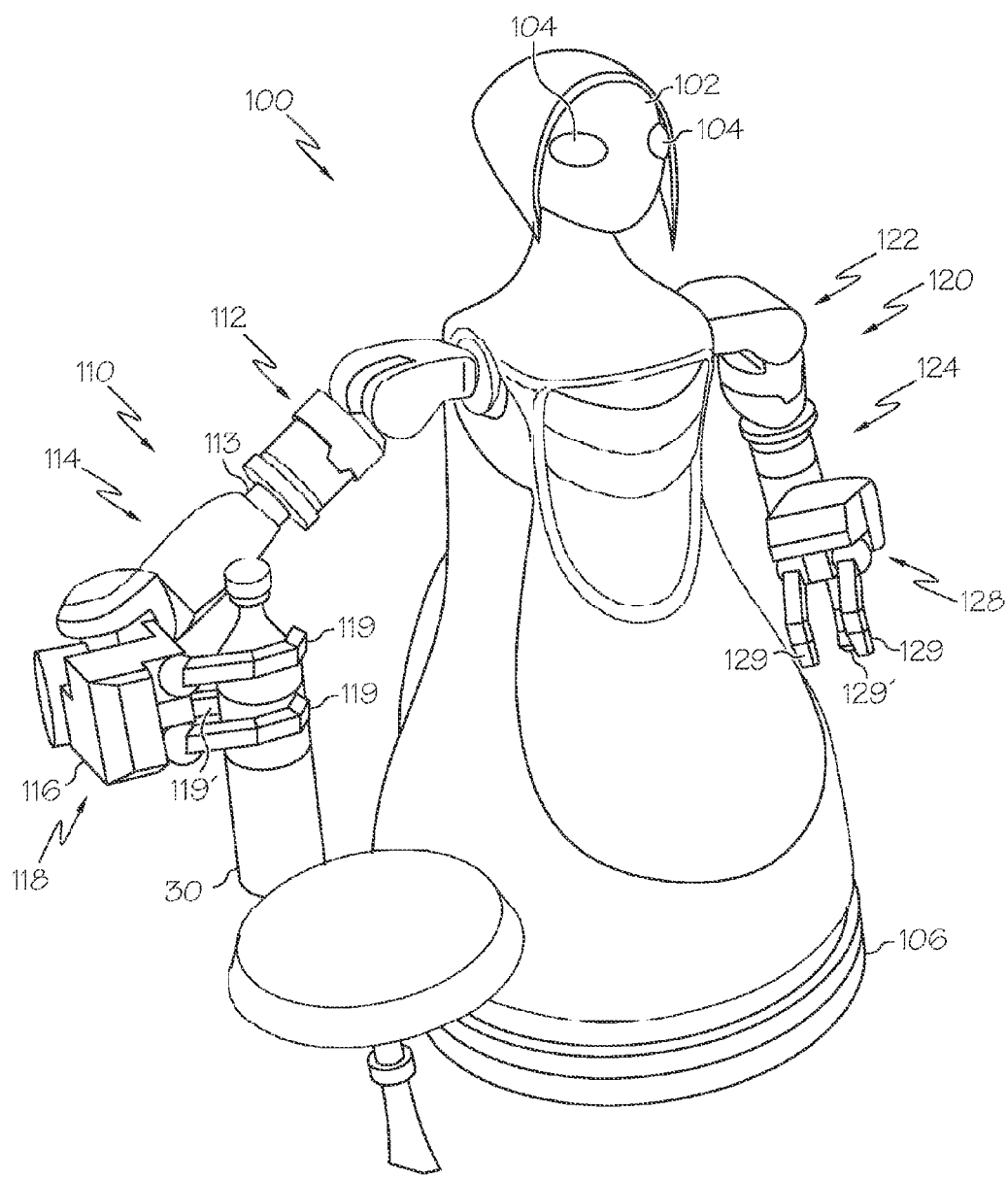
FIG. 1 depicts a schematic illustration of an exemplary robot.

Referring initially to FIG. 1, a robot 100 according to one exemplary embodiment is illustrated. It should be understood that the robot 100 illustrated in FIG. 1 is for illustrative purposes only, and that implementations are not limited to any particular robot configuration. The robot 100 has a humanoid appearance and is configured to operate as a service robot. For example, the robot 100 may operate to assist users in the home, in a nursing care facility, in a healthcare facility, and the like. Generally, the robot 100 comprises a head 102 with two cameras 104 (and/or other sensors such as light sensors) that are configured to look like eyes, a locomotive base portion 106 for moving about in an operational space, a first manipulator 110, and a second manipulator 120.

In this illustrative implementation, the first and second manipulators 110, 120 each comprise an upper arm component 112, 122, a forearm component 114, 124, and a robot hand 118, 128 (i.e., an end effector), respectively. The robot hand 118, 128 may comprise a robot hand comprising a hand portion 116, 126, a plurality of fingers joints 119, 129, and a thumb joint 119', 129' that may be opened and closed to manipulate a target object, such as a bottle 30. The upper arm component 112, 122, the forearm component 114, 124, and robot hand 118, 128 in this illustrative implementation are each a particular component type of the first and second manipulator.

The robot 100 may be programmed to operate autonomously or semi-autonomously within an operational space, such as a home. In one embodiment, the robot 100 is programmed to autonomously complete tasks within the home throughout the day, while receiving commands (e.g., audible or electronic commands) from the user. For example, the user may speak a command to the robot 100, such as "please bring me the bottle on the table." The robot 100 may then go to the bottle 30 and complete the task. In another embodiment, the robot 100 is controlled directly by the user by a human-machine interface, such as a computer. The user may direct the robot 100 by remote control to accomplish particular tasks. For example, the user may control the robot 100 to approach a bottle 30 positioned on a table. The user may then instruct the robot 100 to pick up the bottle 30. The robot 100 may then develop a movement plan for moving within the operational space to complete the task. As described in more detail below, implementations are directed to modifying and/or creating movement plans to account for predicted actions of a person, animal or other independently moving robot.

Figure 2:
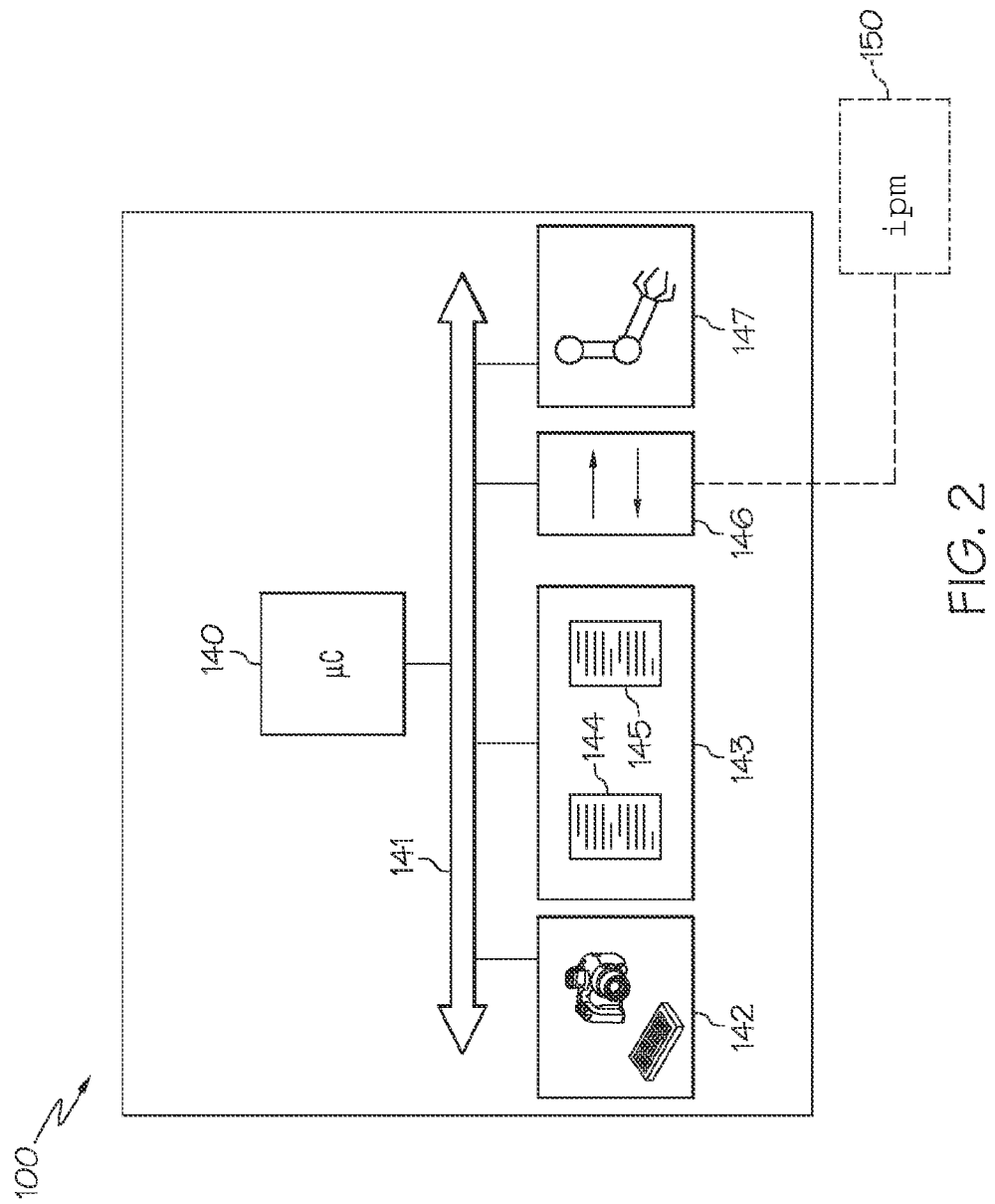
FIG. 2 depicts a schematic illustration of additional exemplary components of an exemplary robot according to one or more embodiments shown and described herein.

Referring now to FIG. 2, additional components of an exemplary robot 100 are illustrated. More particularly, FIG. 2 depicts a robot 100 and an intelligent prediction module 150 (embodied as a separate computing device, an internal component of the robot 100, and/or a computer-program product comprising non-transitory computer-readable medium) for generating and/or modifying movement plans for use by the robot 100 embodied as hardware, software, and/or firmware, according to embodiments shown and described herein. It is noted that the computer-program products and methods for generating and/or modifying individual movement plans may be executed by a computing device that is external to the robot 100 in some embodiments. For example, a general purpose computer (not shown) may have computer-executable instructions for generating and/or modifying individual movement plans. The movement plans that satisfy requirements of the movement may then be sent to the robot 100.

The example robot 100 illustrated in FIG. 2 comprises a processor 140, input/output hardware 142, a non-transitory computer-readable medium 143 (which may store robot data/logic 144, and robot movement logic 145, for example), network interface hardware 146, and actuator drive hardware 147 (e.g., servo drive hardware) to actuate movement of the robot, such as, but not limited to, the robot's locomotive base portion 106. It is noted that the actuator drive hardware 147 may also include associated software to control other various actuators of the robot, such as, but not limited to, manipulator or camera actuators.

The non-transitory computer-readable medium component 143 (also referred to in particular illustrative implementations as a memory component 143) may be configured as volatile and/or nonvolatile computer readable medium and, as such, may include random access memory (including SRAM, DRAM, and/or other types of random access memory), flash memory, registers, compact discs (CD), digital versatile discs (DVD), magnetic disks, and/or other types of storage components. Additionally, the memory component 143 may be configured to store, among other things, robot data/logic 144, robot movement logic 145 and data storage such as a look up table or other data storage structure. A local interface 141 is also included in FIG. 2 and may be implemented as a bus or other interface to facilitate communication among the components of the robot 100 or the computing device.

The processor 140 may include any processing component configured to receive and execute instructions (such as from the memory component 143). The input/output hardware 142 may include any hardware and/or software for providing input to the robot 100 (or computing device), such as, without limitation, a keyboard, mouse, camera, sensor (e.g., light sensor), microphone, speaker, touch-screen, and/or other device for receiving, sending, and/or presenting data. The network interface hardware 146 may include any wired or wireless networking hardware, such as a modem, LAN port, wireless fidelity (Wi-Fi) card, WiMax card, mobile communications hardware, and/or other hardware for communicating with other networks and/or devices.

It should be understood that the memory component 143 may reside local to and/or remote from the robot 100 and may be configured to store one or more pieces of data for access by the robot 100 and/or other components. It should also be understood that the components illustrated in FIG. 2 are merely exemplary and are not intended to limit the scope of this disclosure. More specifically, while the components in FIG. 2 are illustrated as residing within the robot 100, this is a non-limiting example. In some embodiments, one or more of the components may reside external to the robot 100, such as within a computing device that is communicatively coupled to one or more robots.

FIG. 2 also depicts an intelligent prediction module 150 that is configured to predict a behavior within an operational space of the robot 100, generate and/or modify a robot movement plan in response to the predicted behavior, and control end effector motion segments to move the robot in accordance with the robot movement plan. The intelligent prediction module 150 is shown as external from the robot 100 in FIG. 2, and may reside in an external computing device, such as a general purpose or application specific computer. However, it should be understood that all, some, or none of the components, either software or hardware, of the manipulation planning module 150 may be provided within the robot 100. In one implementation, for example, movement plan generation, modification, evaluation and filtering may be performed off-line and remotely from the robot 100 by a computing device such that only generated and/or modified robot movement plans satisfying the requirements of the intelligent prediction module 150 described herein are provided to the robot for use in movement planning. Further, movement planning within the intelligent prediction module 150 may also be performed off-line by an external computing device and provided to the robot 100. Alternatively, the robot 100 may determine motion planning using filtered successful movement plans provided by an external computing device. Components and methodologies of the movement planning module are described in detail below.

Figure 3:
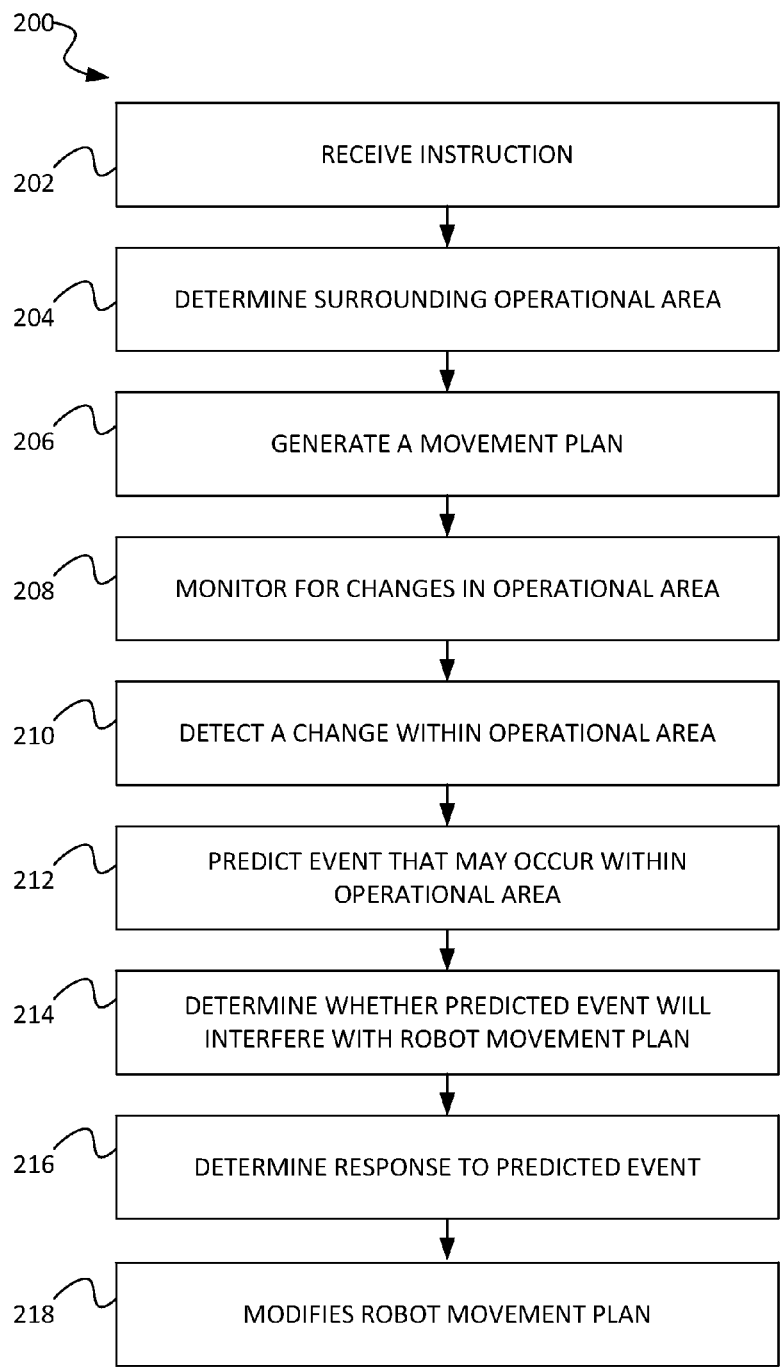
FIG. 3 depicts a flowchart of an example process of controlling the movement and/or motion of an exemplary robot according to one or more embodiments shown and described herein.

FIG. 3 depicts a flowchart of an example process 200 of controlling the movement and/or motion of an exemplary robot according to one or more implementations shown and described herein. In this particular example implementation, a robot system receives an instruction in operation 202. The instruction, for example, may include one or more of an audible (e.g., voice) command, an electronic command from a device such as a remote control, tablet, smartphone or the like. The robot system determines a surrounding operational area in operation 204.

The operation of determining the surrounding operational area, for example, may include using one or more cameras and/or other sensors for detecting one or more objects and/or accessing a data representation of the area (e.g., an internally stored map or look up table) or other representation of the surrounding operational area. Various object recognition algorithms, such as a scale-invariant feature transform (SIFT) algorithm, or object recognition processes may be used. A SIFT algorithm, for example, uses computer vision technology to detect and describe local features in images. Points on an object may be extracted to provide a feature description of the object. This description, extracted from a training image, may then be used to identify an object when attempting to locate the object in a test image containing many other objects. Features extracted from a training image in various implementations may be detectable even under changes in image scale, noise and illumination.

An example robot includes one or more sensors, such as but not limited to one or more camera or light sensors. The robot may determine its location using a stored map or look up table or in another manner know in the art. In some implementations, however, the robot system may already have determined or otherwise know its location.

The robot system then generates a movement plan to carry out the previously received instruction in operation 206. The movement plan, for example, may include a route and/or one or more steps and/or operations for moving within the operational space and performing any requested functions (e.g., grasping and picking up an item off of a table).

Before and/or during implementation of the movement plan, the robot system further monitors for changes in its surrounding operational area in operation 208. The changes in various implementations may include object and/or person movements detected within the operational space. In one particular implementation, for example, the robot system recognizes one or more objects using a camera or other sensor (e.g., a dining room table and chairs). Objects are detected within the robot environment, for example by image recognition software or other data analysis software. Object location changes may be detected by identifying an object in a first location, and later identifying the object in a second location. In some examples, object location change may be detected by first detecting the object at a new location, for example if the object is known to have originated from a previously undetected location.

An object location change may include detection of the object at a plurality of locations, for example the object being removed from a first location to a second location, and then to a third location. An object location change may be related to a predicted behavior of one or more people within the operational space by comparing the detected location change with stored data as described in more detail below. The stored data may include historical data such as object location change patterns previously correlated with a predicted behavior of one or more people within the operational space. A robot may sense an environment over time to detect such object location change patterns and collect stored data for future use, for example during a training stage.

Objects may be individually identified, and/or identified by an object class. An object state may be sensed over time, continuously, or at intervals. The object state may include an object location, configuration (if appropriate), operational condition (for example on or off) or other state parameter that may be appropriate. In some examples, human actions may also be detected and categorized. The use of object location changes can be used to restrict the possible set of human actions, facilitating identification.

As described in more detail below, the predicted behavior of one or more people within the operational space of the robot can be determined from an object location change. However, another possible advantage of implementations provided herein is that human actions do not need to be interpreted. For example it may not matter how a person moves an object from one location to the other. The mere fact of the change in object location can be used to predict how one or more people may behave within the operational space of the robot, even if the human activities have been substantially ignored by the robot.

A pattern recognition algorithm may be used to compare object location changes to sets of previously observed data. Any pattern recognition algorithm may be used, such as a nearest neighbor algorithm, or algorithms well known in other fields such as genetics. In some examples, a current object location change may be compared with all previously observed object location change patterns. However, as the volume of stored data increases, frequent patterns may be identified. Frequent patterns may also be codified as a rule. In some examples, an object location change may be first compared with known frequent patterns and, if appropriate, rules. If no match occurs a more extensive comparison may be made. In other examples, a looser match to previously observed patterns may be used if no initial match is made.

Figure 4:
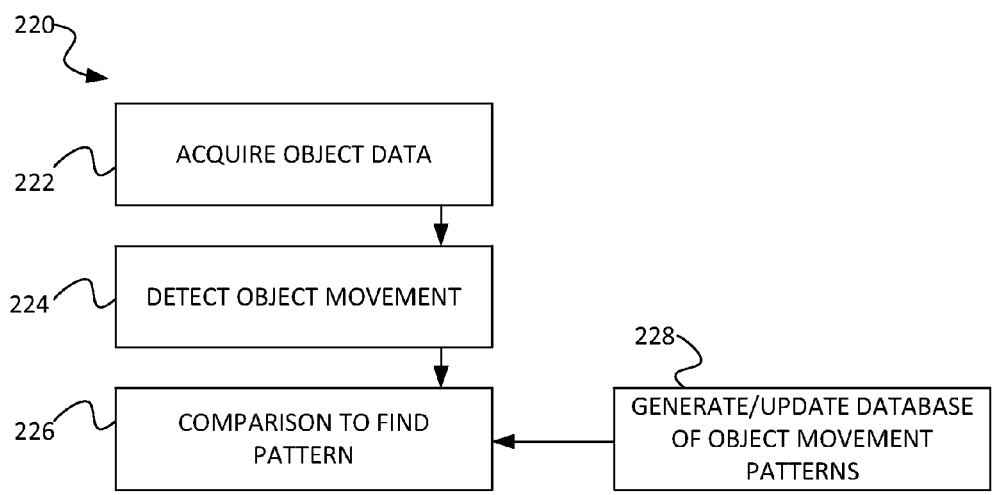
FIG. 4 depicts a flowchart of an example process of detecting a change within an operational space of a robot such as shown in FIG. 3 according to one or more embodiments shown and described herein.

FIG. 4 is a simplified flowchart of an example process 220 of detecting a change within an operational space of a robot such as shown in operation 210 of FIG. 3. In operation 222, a robot system acquires object data. The robot system detects object location changes in operation 224. The robot system also compares a currently detected object location change with stored object location change patterns as described above. Operation 228, which may be carried out in parallel, before the other steps or after the completion of a robot activity (e.g., after the process shown in FIG. 3 is complete), may include generating and updating a database of object location change patterns. This database is used for the comparison mentioned in relation to operation 226. Further, the database may be updated by comparing the accuracy of a prediction (e.g., made in the process of FIG. 3) to an actual behavior that was subsequently monitored. After a task is complete, the robot system may continue to acquire object data for example as shown at operation 222.

Returning to FIG. 3, in response to the detection of a change within the robot's operational space, the robot system predicts an event that may occur in response to the detected change in operation 212. In some implementations, for example, the robot system utilizes a look up table or other data store to predict the event that may occur as described in detail herein. Other implementations may use any other prediction technology.

The robot system then determines whether the predicted event will interfere with its movement plan in operation 214. In one implementation, for example, the robot system compares the predicted event to its movement plan to determine whether the predicted event (or the detected object or person movement itself) interferes with the movement plan. In one implementation, for example, the movement plan may include a route that may be stored, for example, in conjunction with a map or other data representative of the operational area of the robot. A predicted event may also correspond to space or location with respect to a detected object or person location within the operational space. For example, if a chair is determined to be pushed back from a table and a person is determined to be standing from the chair, the predicted event of the person moving away from the table may include a perimeter of likely movement (e.g., a semi-circle of "x" meters from the location of the chair). If the perimeter of likely movement is determined to overlap (or come within a predetermined threshold of) the route of the movement plan within a time frame in which the robot is likely to be a that location, the robot system may determine that the predicted event interferes with the movement plan of the robot.

If the predicted event is determined to be likely to interfere with the movement plan of the robot, the robot system determines a response based upon the predicted event in operation 216. If the response varies from the movement plan, the robot system modifies the movement plan in operation 218 to include the determined response.

Figure 5:
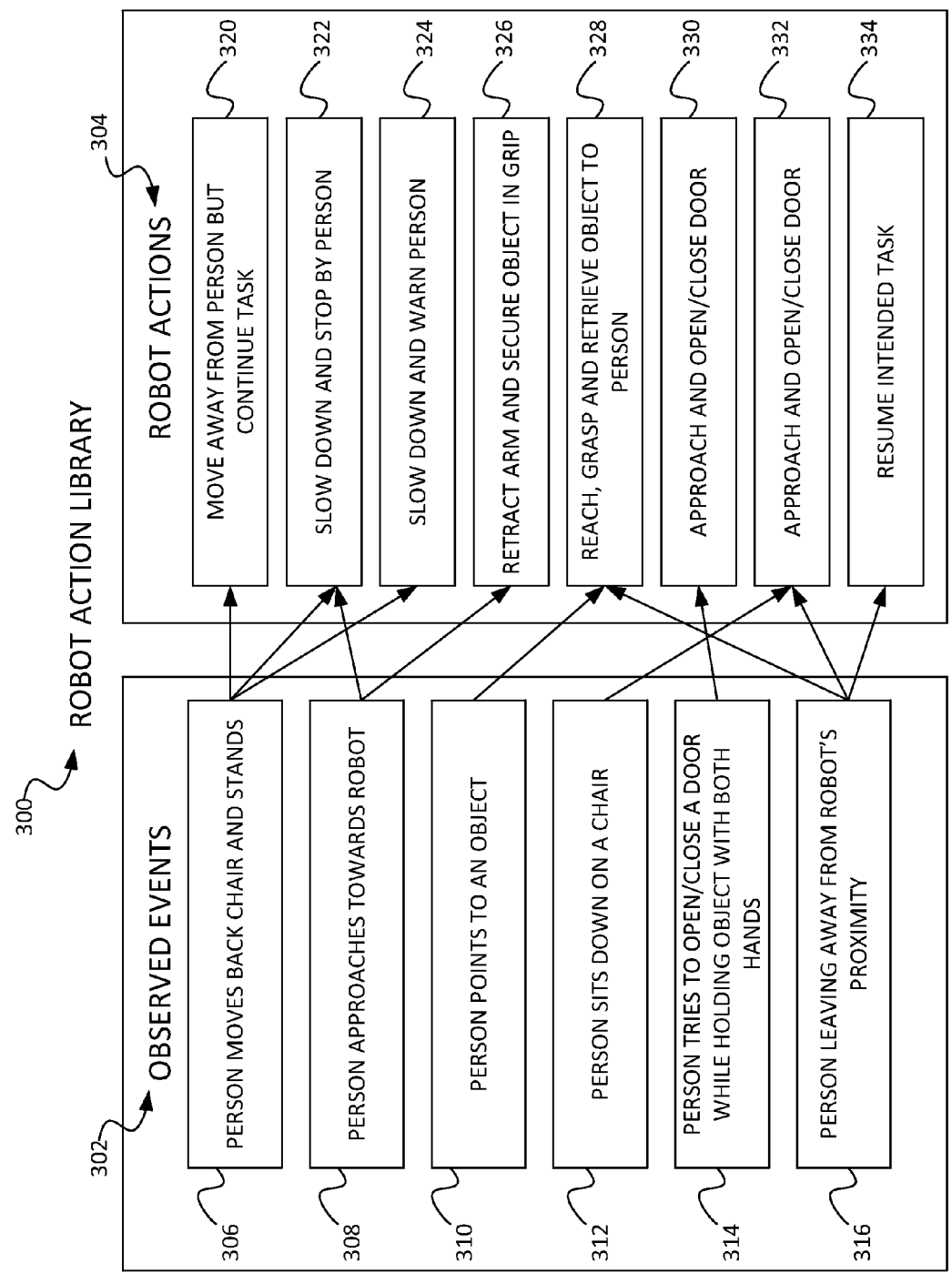
FIG. 5 depicts a schematic representation of an example look up table or other data store including a set of observed events and robot actions that may be taken in response to the observed events according to one or more embodiments shown and described herein.

FIG. 5 depicts a schematic representation of an example look up table 300 or other data store including a set of observed events and robot actions that may be taken in response to the observed events. Although a look up table is described with reference to particular implementations, the robot system may use any other type of data structure to identify robot actions from correlated observed events such as various types of databases (e.g., relational databases). The particular observed events and robot actions in the look up table 300 are merely exemplary and not limiting in any manner.

In this particular implementation, the look up table 300 includes a plurality of possible observed events 302 that the robot system may detect within an operational space of the robot and correlated robot actions 304 that may be taken in response to the events being detected. For example, if a robot is operating within an operational space (e.g., a dining room) where one or more persons are seated at a table, an event 306 that may be observed by the robot system is a chair being moved away from the table and a person standing. In response to this action, the robot system may predict that the person is about to move away from the table. The robot, in response, can be directed to take one or more robot action that is correlated with the observed event, such as (i) an action 320 of moving away from the person but continuing a given task, (ii) an action 322 of slowing down and stopping by the person and/or (iii) an action 324 of slowing down and warning the person. A robot movement plan may also be modified to incorporate the one or more selected robot action.

Similarly, if a robot determines an event 308 that a persons is approaching the robot, the robot system may access the look up table 300 and select one or more actions correlated to the determined event, such as (i) an action 322 of slowing down and stopping by the person and (ii) an action 326 of retracting one or more robot arm and securing an object in its grasp (if any).

Where the robot system determines an event 310 that a person in the operational space is pointing to an object, the robot system may interpret the event as indicating that the person wants the object retrieved. Thus, a movement plan of the robot system may be modified to move to take an action 328 to, reach, grasp and retrieve the object to the person.

If the robot system determines an event 312 that a person sits down on a chair (or otherwise moves away from a path of the robot), the robot may take an action 332 to accelerate and resume its travel speed in accordance with its movement plan.

If the robot determines an event 314 that a person is trying to perform an action such as opening or closing a door while holding an object in both hands, the robot system may take an action 330 to alter its movement plan to approach and open or close the door for the person.

If the robot determines an event 316 that a person is moving away from the robot's proximity, the robot system may alter its movement plan to take an action such as (i) an action 332 to accelerate and resume its travel speed in accordance with its movement plan or (ii) an action 334 to resume its intended task.

The possible observed events 302 and correlated robot actions 304 shown in FIG. 5 are merely exemplary and not limiting. Other events and correlated robot actions are contemplated.

Figure 6:
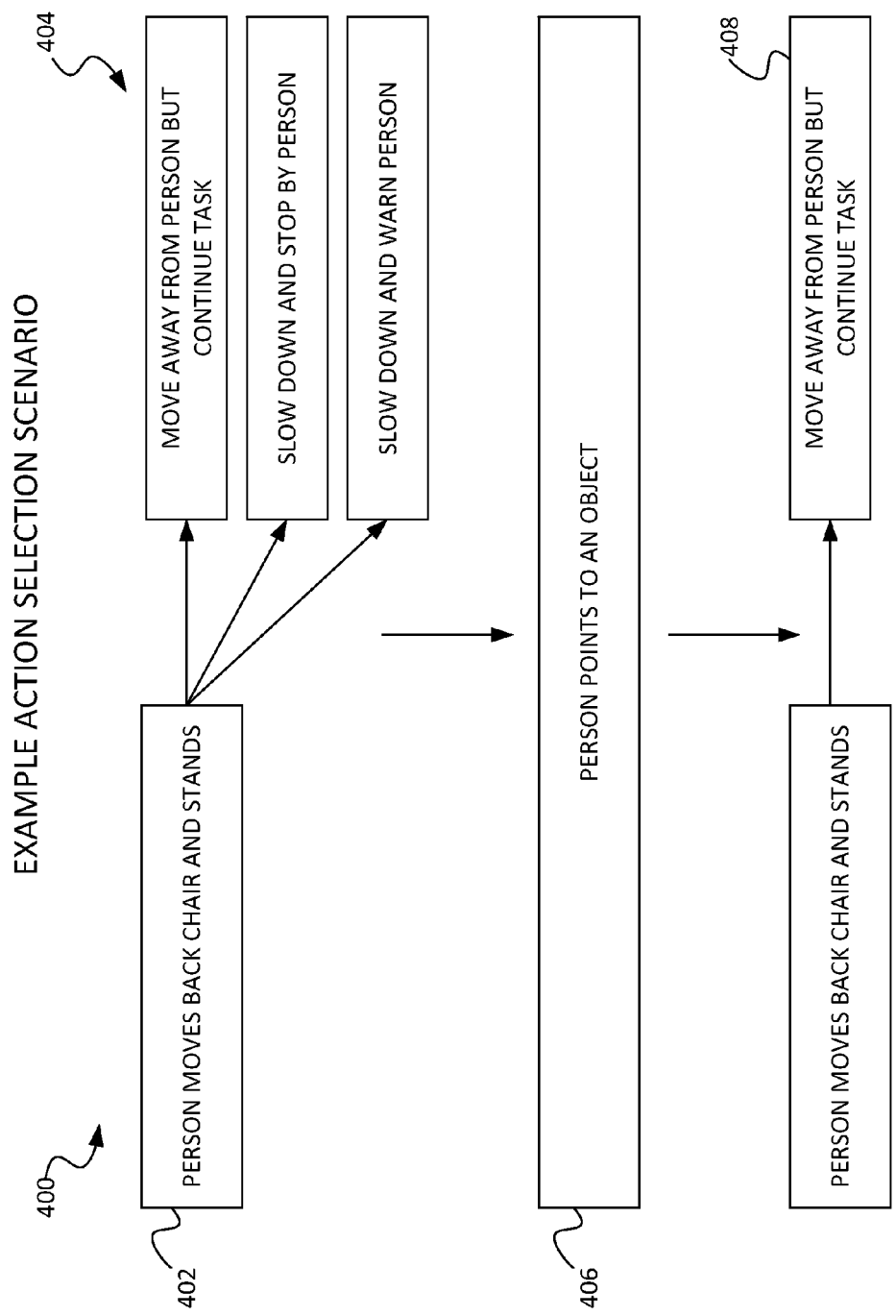
FIG. 6 depicts an example robot action selection process according to one or more embodiments shown and described herein.

FIG. 6 depicts an example robot action selection process 400 according to one or more embodiments shown and described herein. In this example, a robot system predicts one or more events from one or more changes within an operational space of a robot and identifies one or more correlated robot actions that may be taken in response to the detected event(s). The robot then analyzes the possible correlated robot action(s) in comparison to its current movement plan to determine if a modification of the current movement plan is warranted.

In FIG. 6, for example, a robot system detects a person moving a chair back from a table and standing within an operational space of the robot in operation 402. The robot system also identifies three correlated potential robot actions, such as from a look up table, in operation 404. In operation 406, the robot system analyzes its current movement plan in view of the detected event (i.e., a person moving back a chair and standing) and determines that there is still sufficient space within its operational space to move around the person and complete its current task. Thus, in this example, the robot system selects the robot action of moving away from the person but continuing its given task in operation 408, and the robot modifies its movement plan accordingly.

In one implementation, a method for responding to a detected event by a robot is provided. The method includes using a sensor to detect an event within an operational space of a robot. The event includes a movement of an object or a person within the operational space. The method also includes using a processor to predict an action to occur within the operational space of the robot based upon the detected event. The method also identifies at least one correlated robot action to be taken in response to the detected event and compares the predicted action to a movement plan of the robot. The method further selects at least one of the correlated robot actions and modifies a movement plan of a robot to include at least one of the identified correlated robot actions in response to the detected event. In various implementations, the methods and apparatuses provided herein provide a benefit of allowing a robot to predict actions of people within an operational space and automatically respond by modifying a movement plan of a robot. By detecting an object or person moving within the operational space, the robot may identify one or more predicted behaviors that a person may make within the operational space.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for responding to a detected event by a robot comprising:
   executing a movement plan of the robot within an operational space of the robot;
   monitoring the operational space of the robot for a movement of an object within the operational space while executing the movement plan, wherein the operation of monitoring the operational space of the robot is performed using a camera and using object recognition on an image captured by the camera;
   detecting, with a sensor, the event within the operational space of the robot, wherein the event comprises a movement of the object caused by the person within the operational space;
   predicting, using a processor, an action of the person to occur within the operational space of the robot based upon the detected event, wherein the predicted action comprises a predicted movement of the person within the operational space;
   accessing a data structure using the event to identify at least one correlated robot action to be taken in response to the detected event;
   comparing the predicted action to the movement plan of the robot and selecting at least one of the correlated robot actions;
   modifying the movement plan of the robot to include at least one of the identified correlated robot actions in response to the detected event; and
   controlling the robot to take the at least one correlated robot action in accordance with the modified movement plan,
   wherein the operation of comparing the predicted action to the movement plan of the robot comprises determining whether the predicted action will interfere with the movement plan,
   wherein the movement plan is adapted for use in controlling movement of the robot within the operational space and
   wherein the operation of controlling the robot to take the at least one correlated robot action comprises moving the robot in accordance with the modified movement plan.

2. The method of claim 1 wherein the operation of predicting comprises accessing a data store.

3. The method of claim 1 wherein the data structure comprises at least one of the group of: a look up table, a database, and a relational database.

4. The method of claim 1 wherein the detected event comprises at least one of the group of: a chair moving, a person standing, a person approaching the robot, a person pointing, a person gesturing, a person sitting, a person moving away from the robot, a person opening a door, and a person closing a door.

5. The method of claim 1 wherein the modified movement plan comprises at least one of the group of: warning the person, slowing a speed of the robot, stopping the robot, continuing a task, moving away from the person, retracting a component of the robot, reaching for an object, grasping an object; retrieving an object, approaching a person, and accelerating a speed of the robot.

6. The method of claim 1 wherein the operation of detecting an event is performed using object recognition on images captured by the camera.

7. The method of claim 1 wherein the data structure comprises a plurality of events including a plurality of object changes within the operational space.

8. An apparatus comprising:
   a robot locomotion device adapted to move a robot within an operational space of the robot;
   a camera sensor adapted to monitor the operational space for movement of an object; and
   a controller adapted to control the robot locomotion device in accordance with a movement plan,
   wherein the controller is further adapted to:
      execute the movement plan of the robot within the operational space;
      detect, using the camera sensor, an event within the operational space of the robot-comprising movement of the object while executing the movement plan, wherein the event comprises movement of the object caused by a person within the operational space, wherein the controller is adapted to monitor the operational space using object recognition on an image captured by the camera sensor;
      predict an action of the person to occur within the operational space, wherein the predicted action comprises movement of the person within the operational space;
      access a data structure using the event to identify at least one correlated robot action to be taken in response to the detected event;
      compare the predicted action to the movement plan of the robot to determine if the predicted action will interfere with the movement plan and, when the predicted action is determined to interfere with the movement plan, select at least one of the correlated robot actions; and
      modify the movement plan to include at least one of the identified correlated robot actions in response to the detected event; and
      control the robot to take the at least one correlated robot action in accordance with the modified movement plan to move the robot in accordance with the modified movement plan,
   wherein the movement plan is adapted for use in controlling movement of the robot within the operational space.

9. The apparatus of claim 8 wherein the modified movement plan comprises at least one of the group of: warning the person, slowing a speed of the robot, stopping the robot, continuing a task, moving away from the person, retracting a component of the robot, reaching for the object, grasping the object; retrieving the object, approaching the person, and accelerating the speed of the robot.

10. The apparatus of claim 8 wherein the camera sensor comprises a video camera.

11. The apparatus of claim 8 wherein the movement plan comprises locomotion of the robot within the operational space.

12. The apparatus of claim 8 wherein the movement plan comprises motion of one or more components of the robot.

13. The apparatus of claim 8 wherein the data structure comprises at least one of the group of: a look up table, a database, and a relational database.

14. The apparatus of claim 8 wherein the data structure comprises a plurality of events and correlated robot actions including historical event data previously correlated with predicted actions.

15. The apparatus of claim 8 wherein the data structure comprises a plurality of events including a plurality of object changes within the operational space.

\* \* \* \* \*